(12) United States Patent
Tanaka

(10) Patent No.: US 7,392,194 B2
(45) Date of Patent: Jun. 24, 2008

(54) VOICE-CONTROLLED NAVIGATION DEVICE REQUIRING VOICE OR MANUAL USER AFFIRMATION OF RECOGNIZED DESTINATION SETTING BEFORE EXECUTION

(75) Inventor: Makoto Tanaka, Anjo (JP)

(73) Assignee: DENSO CORPORATION, Kariya (JP)

( * ) Notice: Subject to any disclaimer, the term of this patent is extended or adjusted under 35 U.S.C. 154(b) by 845 days.

(21) Appl. No.: 10/602,700

(22) Filed: Jun. 25, 2003

(65) Prior Publication Data

US 2004/0006479 A1 Jan. 8, 2004

(30) Foreign Application Priority Data

Jul. 5, 2002 (JP) ............... 2002-197262

(51) Int. Cl.
*G10L 15/22* (2006.01)
*G01C 21/00* (2006.01)
(52) U.S. Cl. ..................... 704/275; 701/201
(58) Field of Classification Search ........... 704/275; 701/201
See application file for complete search history.

(56) References Cited

U.S. PATENT DOCUMENTS

| | | | | |
|---|---|---|---|---|
| 4,827,520 A | * | 5/1989 | Zeinstra | 701/1 |
| 5,754,430 A | * | 5/1998 | Sawada | 701/209 |
| 6,012,030 A | * | 1/2000 | French-St. George et al. | 704/275 |
| 6,040,824 A | * | 3/2000 | Maekawa et al. | 345/173 |
| 6,098,015 A | * | 8/2000 | Nimura et al. | 701/209 |
| 6,157,342 A | * | 12/2000 | Okude et al. | 342/357.13 |
| 6,181,996 B1 | * | 1/2001 | Chou et al. | 701/36 |
| 6,230,132 B1 | * | 5/2001 | Class et al. | 704/270 |
| 6,324,507 B1 | | 11/2001 | Lewis et al. | |
| 6,560,574 B2 | | 5/2003 | Lewis et al. | |
| 6,826,472 B1 | * | 11/2004 | Kamei et al. | 701/202 |
| 6,968,311 B2 | * | 11/2005 | Knockeart et al. | 704/270 |
| 6,970,824 B2 | * | 11/2005 | Hinde et al. | 704/270.1 |

(Continued)

FOREIGN PATENT DOCUMENTS

JP A-S57-188190 11/1982

(Continued)

OTHER PUBLICATIONS

Japanese Communication dated Aug. 23, 2005 with its English translation.

(Continued)

*Primary Examiner*—Tālivaldis Ivars Šmits
(74) *Attorney, Agent, or Firm*—Posz Law Group, PLC

(57) ABSTRACT

A voice control system is directed to a car navigation device that includes: a display unit; a microphone; a speech recognition unit for recognizing, as a command, a speech uttered by a user; and a navigation ECU to which the voice recognition unit outputs the command. When the user inputs the speech, auxiliary switches are shown on the display unit. When the user selects one of the auxiliary switches, respective functions that correspond to the auxiliary switches are executed. The functions include displaying a voice command list or guidance for voice input on the displaying unit or outputting, to the navigation ECU, a result of determination whether a certain function, such as setting of a destination, should be allowed to be executed, the user first being required to affirm or negate the recognized destination setting by voice or auxiliary switch.

5 Claims, 4 Drawing Sheets

U.S. PATENT DOCUMENTS

| | | | |
|---|---|---|---|
| 7,167,826 B2* | 1/2007 | Cho | 704/201 |
| 2001/0016789 A1* | 8/2001 | Staiger | 701/1 |
| 2002/0069071 A1* | 6/2002 | Knockeart et al. | 704/275 |
| 2002/0107696 A1* | 8/2002 | Thomas et al. | 704/275 |
| 2002/0120455 A1* | 8/2002 | Nakata | 704/275 |
| 2003/0014261 A1* | 1/2003 | Kageyama | 704/275 |
| 2003/0195749 A1* | 10/2003 | Schuller | 704/258 |

FOREIGN PATENT DOCUMENTS

| | | |
|---|---|---|
| JP | A-59-157699 | 7/1984 |
| JP | A-S61-21526 | 1/1986 |
| JP | A-61-84771 | 4/1986 |
| JP | A-S64-56428 | 3/1989 |
| JP | A-H03-76356 | 4/1991 |
| JP | A-7-295586 | 11/1995 |
| JP | A-H10-312193 | 11/1998 |
| JP | A-2001-282284 | 10/2001 |
| JP | A-2002-149192 | 5/2002 |

OTHER PUBLICATIONS

Notice of Reason for Refusal issued from Japanese Patent Office issued on Nov. 22, 2005 for the corresponding Japanese patent application No. 2002-197262 (a copy and English translation thereof).

* cited by examiner

VOICE-CONTROLLED NAVIGATION DEVICE REQUIRING VOICE OR MANUAL USER AFFIRMATION OF RECOGNIZED DESTINATION SETTING BEFORE EXECUTION

CROSS REFERENCE TO RELATED APPLICATIONS

This application is based on and incorporates herein by reference Japanese Patent Application No. 2002-197262 filed on Jul. 05, 2002.

FIELD OF THE INVENTION

The present invention relates to a voice control system that enhances usability in voice input manipulation with having an auxiliary display.

BACKGROUND OF THE INVENTION

A speech uttered by a speaker is conventionally used for controlling various functions of a camera or a car navigation device. For instance, in JP-A-S64-56428, a camera control system using voice input is described as follows: a speech corresponding to required manipulation is inputted; the speech is recognized by a voice recognition unit; and the camera is controlled based on a control processing corresponding to a recognition result.

In this voice-controlled camera, a certain function can be executed by a certain voice command having one-to-one correspondence with the certain function. For instance, only "no strobe" can be functional as the certain voice command for prohibiting a strobe light at shooting, even though "strobe off," "stop strobe," or "flash off" may be used depending on a user.

A user therefore needs to correctly memorize a certain voice command that enables a certain function to be executed. However, user's workload increases with increasing executable functions. This results in worsening usability in voice input.

In voice recognition, a shorter word is apt to be mis-recognized. For instance, there is a case where a user inputs an address of a destination through voice input in a car navigation device and is then required for determining whether a point designated on a map is correct as a destination. In this case, the user sets or cancels the destination by uttering "YES" or "NO," respectively. However, the short word of "YES" or "NO" is apt to be mis-recognized, so that a function of setting the destination is sometimes executed against user's intention.

SUMMARY OF THE INVENTION

It is an object of the present invention to provide a voice control system that enhances usability of voice input manipulation with an auxiliary display.

To achieve the above object, a voice control system having a display is provided with the following. When a user inputs a speech, an auxiliary switch is displayed for executing an auxiliary function of inputting the speech. When the auxiliary switch is selected, the auxiliary function is executed. In this structure, the auxiliary switch can be used for a case where mis-recognizable voice input may be apt to happen. This results in improving usability of a voice control system in comparison with a voice control system that uses voice input alone.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A car navigation device provided in a vehicle will be explained as an embodiment that a voice control system of the present invention is directed to.

Figure 1:
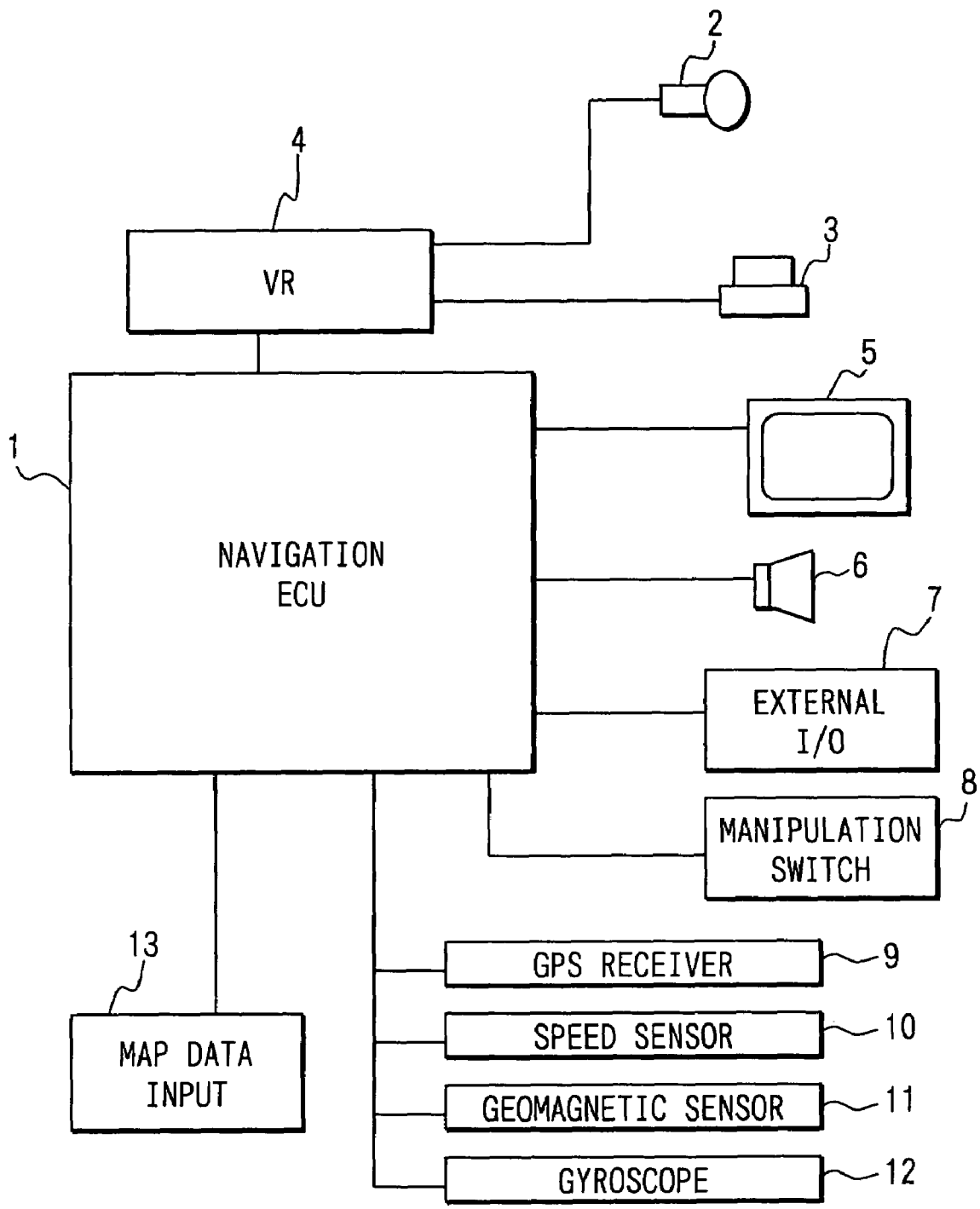
FIG. 1 is a schematic block diagram showing structure of a car navigation device including a voice control system according to an embodiment of the present invention.

As shown in FIG. 1, the car navigation device includes a position detection section that includes: a global positioning system (GPS) receiver 9; a speed sensor 10; a geomagnetic sensor 11; and a gyroscope 12, all of which are connected with a navigation electronic control unit (ECU) 1. The car navigation device further includes: a voice recognition (VR) unit 4 having a microphone 2 and talk switch 3; a map data input unit 13; and a manipulation switch input unit 8, all of which are also connected with the navigation ECU 1. Furthermore, a display unit 5, a speaker 6, and an external input/output (I/O) unit 7 are connected with the navigation ECU 1.

The navigation ECU 1 is formed as a known computer and includes internal components such as a CPU, a ROM, a RAM, and an input/output (I/O) circuit, and a communications bus that connects the internal components. The ROM is stored with a program that is executed in the navigation device, and the CPU processes according to the program. The program can be obtained through the external I/O unit 7.

As explained above, the position detection section includes, as position sensors, the GPS receiver 9, the speed sensor 10, the geomagnetic sensor 11, and the gyroscope 12. Each of them has respectively differently natured error range, so that a position is calculated by using plural sensors with adjusting each another. In addition, according to accuracy of each sensor, the position detection section can be formed of part of the above position sensors. A revolution sensor for detecting steering position or a yaw rate sensor can be used for detecting the position.

The map data input unit 13 is for inputting, to the navigation ECU 1, map data such as road data or landmark data. The unit 13 includes storage for storing the map data. As the storage, a CD-ROM or a DVD-ROM is generally used due to data volume of the map data. However, a memory card or a hard disk drive can be also used.

The display unit 5 is formed of a liquid crystal display. The display unit 5 shows, on its screen, the map data from the map data input unit 13, an own vehicle mark based on a current position detected by the position detection section, and additional data such as a guiding route.

The external I/O unit 7 is for receiving outside information such as Vehicle Information and Communication System (VICS) or sending out information. The outside information is processed by the navigation ECU 1. The processed information such as traffic jam information or traffic regulation information is superimposed on the map data shown on the screen of the display unit 5. When needed, information processed by the navigation ECU 1 is sent out through the external I/O unit 7.

The manipulation switch input unit 8 is used for input and is formed of a touch switch integrated into the display unit 5, a mechanical switch, or the like. The navigation device of this embodiment has a function of route assistance. Here, when position of a destination is inputted through the manipulation switch input unit 8, an appropriate route from the current position to the destination is automatically selected and shown on the screen of the display unit 5.

The microphone 2 and the talk switch 3 are used for voice input. As a press button of the talk switch 3 is pressed, an input trigger is sent to the VR unit 4. As the VR unit 4 receives the input trigger, it shifts to a voice input mode of accepting the voice input through the microphone 2.

At the voice input mode, when a user utters a speech of "current position," the speech is converted to a voice signal through the microphone 2 and sent to the VR unit 4. The VR unit 4 recognizes the voice signal, and converts it into a manipulation command corresponding to the speech. The VR unit 4 then sends the manipulation command to the navigation ECU 1. Thus, the speech is recognized as "CURRENT POSITION" and converted into the manipulation command of "DISPLAY CURRENT POSITION." The navigation ECU 1 that receives this manipulation command displays a road map surrounding the current position on the screen of the display unit 5.

The speaker 6 is used for outputting voice guidance or various alarms. For instance, it can be a speaker that is previously installed in the vehicle or a speaker that is built in the car navigation device.

Processing of the car navigation device will be explained below from when a voice is inputted to when a function based on the inputted voice is executed, referring to FIG. 2.

At Step 10, a waiting state continues till the talk switch 3 is pressed by a user, and processing proceeds to Step 20 when the talk switch 3 is pressed.

At Step 20, the VR unit 4 shifts to the voice input mode where the voice input can be received.

At Step 30, almost simultaneously with above shifting to the voice input mode, an assist window and auxiliary switches for assisting the voice input manipulation are shown on the screen of the display unit 5 by the navigation ECU 1.

Figure 3:
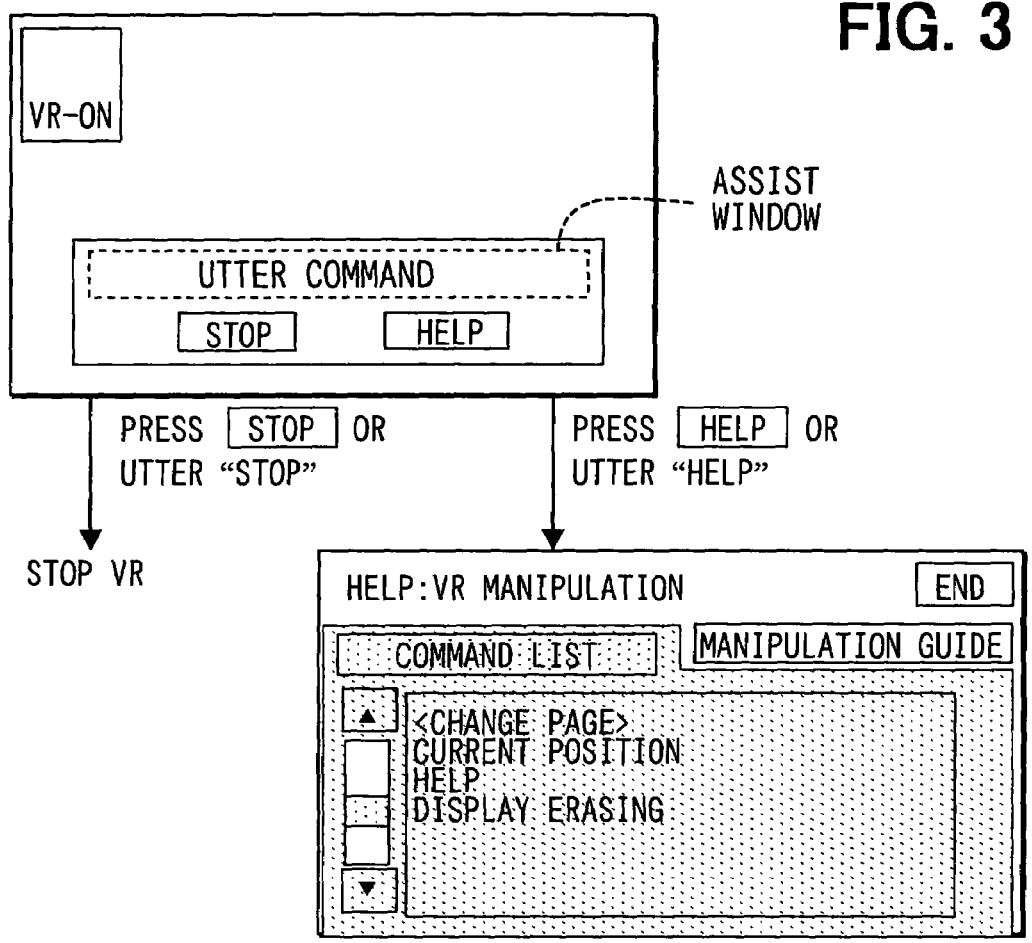
FIG. 3 is a schematic diagram explaining an instance of an assist window and auxiliary switches for assisting voice input manipulation on a display unit.

Instances of the assist window and the switches are shown within a screen in an upper portion of FIG. 3. The instances are shown when the VR unit 4 shifts to the voice input mode. The assist window shows "UTTER COMMAND" for notifying that the voice input can be presently accepted. The auxiliary switches of "STOP" and "HELP" are also shown.

Here, in order to execute a function of the navigation device through the voice input, a voice command corresponding to the function must be properly uttered. Furthermore, for instance, regarding setting of a destination, there are various input methods that use an address, a phone number, a building name, a genre (such as restaurant and gas station), and the like. Furthermore, in each of the input methods, prescribed commands are needed to be accurately uttered in a prescribed order.

However, it is very difficult for the user to thoroughly memorize rules of the voice input manipulation and voice commands. This results in adversely affecting usability of the voice input manipulation.

In this embodiment, "HELP" is provided, as an auxiliary switch of voice input manipulation, along with the assist window so that the voice input manipulation can be smoothly operated even if the rules or the voice commands are forgotten.

For instance, in a case that the manipulation switch input unit 8 is integrated into the display unit 5 as a touch switch, the auxiliary switch of "HELP" is selected by being touched on the display area of "HELP." Here, the touch switch is preferable provided in the display unit 5 so that the auxiliary switch can be easily selected by just being touched. Easy manipulation of the touch switch enhances improvement of providing the auxiliary switch.

At Step 40, it is determined whether one of the auxiliary switches is selected. When the one of the auxiliary switches is determined to be selected, the processing proceeds to Step 50.

At Step 50, an auxiliary function corresponding to the selected auxiliary switch is executed. Here, when the switch of "HELP" is selected, a voice recognition (VR) manipulation HELP window is shown with including a list of commands that are recognizable by voice input, as shown on a screen in a lower portion of FIG. 3. When the list needs more area of a one-page window, any desired command included in the list can be selected through touching a scroll button located in the leftmost portion of the HELP window.

A switch of "MANIPULATION GUIDE" is also shown within the HELP window. When this switch is selected, guidance such as the above-mentioned rules for the voice input manipulation can be shown. Furthermore, a switch of "END" is shown within the HELP window. When this switch is selected, this HELP window can be erased.

Along with the auxiliary switch of "HELP," another auxiliary switch of "STOP" is provided for stopping the voice input mode, as shown within the screen in the upper portion of FIG. 3. Typically, after the voice input mode is started, stopping of the voice input mode must be instructed through the voice input. Providing the auxiliary switch of "STOP" enables mis-recognition of voice to be prevented and the voice input to be securely stopped.

Furthermore, the auxiliary switches of "HELP" and "STOP" can be also selected through voice input. When voice of "HELP" or "STOP" inputted through a microphone 2 is recognized, display of the above voice recognition (VR) manipulation HELP window or stopping of the voice input mode is executed respectively.

Figure 2:
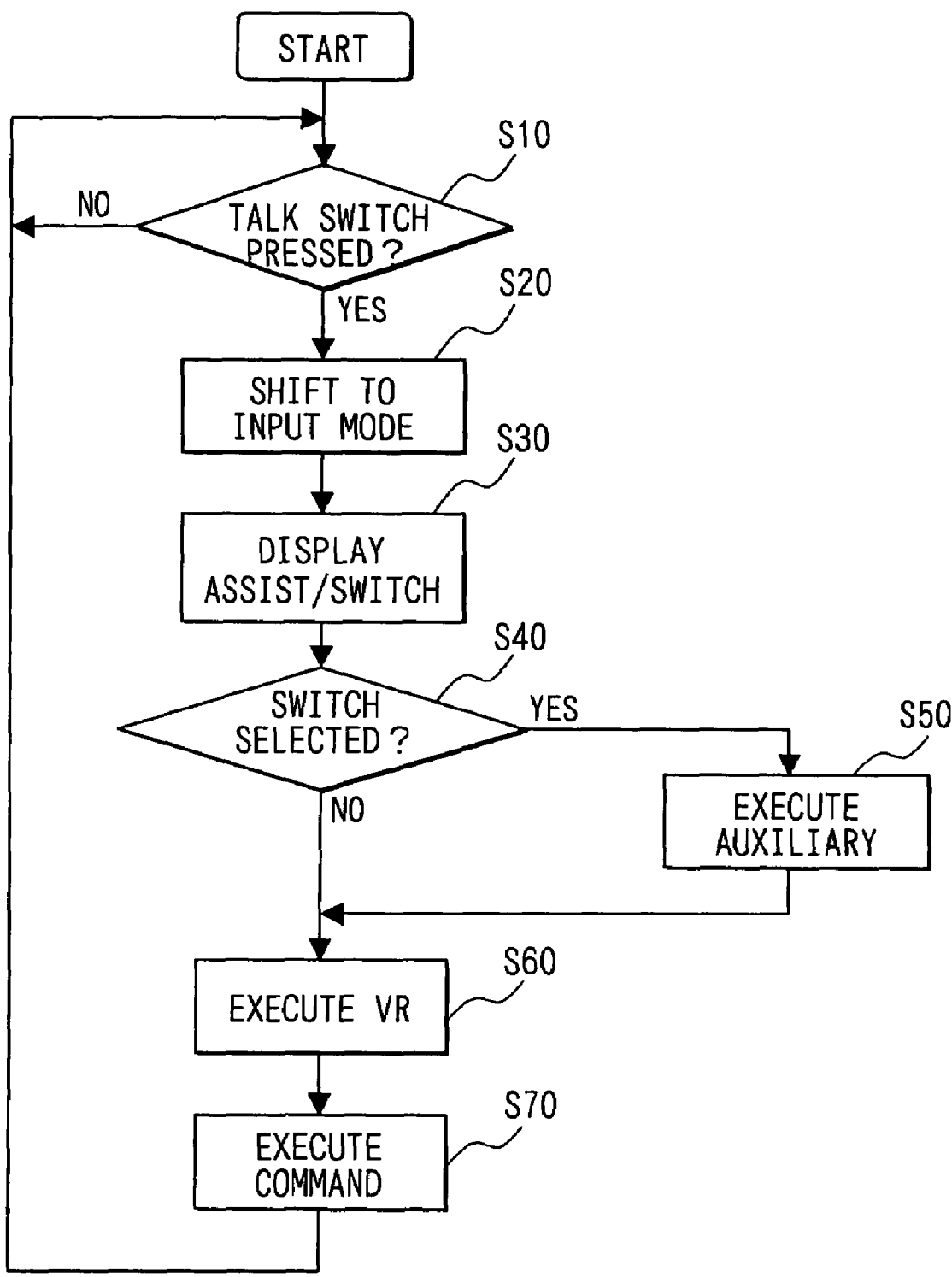
FIG. 2 is a flow diagram explaining processing of voice recognition in the car navigation system.

When a voice command is inputted by the user while the assist window or the HELP window is shown on the screen of the display unit 5 as explained above, processing of voice recognition is executed at Step 60 in FIG. 2. In the voice recognition, the inputted voice command is collated with speech contents previously stored as reference commands, so that a speech content corresponding to the inputted voice command is extracted.

At Step 70, a function corresponding to the extracted speech content is executed.

In the next place, other instances of the assist window and auxiliary switches for assisting the voice input manipulation will be explained below with referring to FIGS. 4 and 5.

Figure 4:
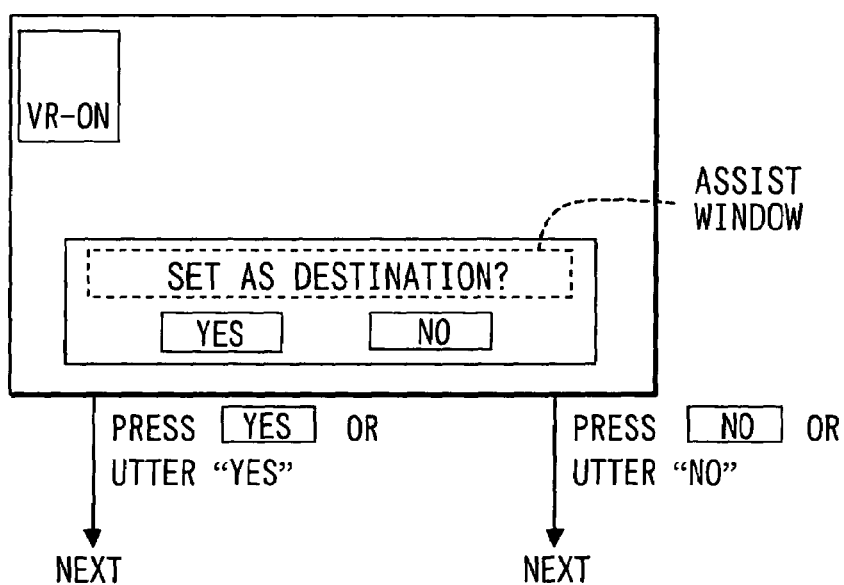
FIG. 4 is a schematic diagram explaining another instance of an assist window and auxiliary switches for assisting voice input manipulation on the display unit.

A display instance in FIG. 4 is a display shown after a target destination is inputted with an address, a phone number, or a building name. At setting of a destination, there is a case where an inputted position or building as the target destination is not directly determined as a destination but once shown on the screen along with being superimposed on the map (not shown in FIG. 4) for seeking user's confirmation.

In this case, "IS THIS POINT SET AS DESTINATION?" in the assist window is displayed along with auxiliary switches of "YES" and "NO."

Here, although a short word of "YES" or "NO" is inputted as a voice input, the short word is apt to be mis-recognized in the voice recognition. As a result, even though the user inputs a proper destination through the voice input, setting of the destination is sometimes cancelled, against user's intention, in such a final confirmation step. When the short word or command is inputted through the voice input, addition of switch manipulation input to the voice input can therefore inhibit an unintended function from being executed.

Voice announcement through the speaker 6 can be used along with the assist window on the display unit 5. However, functions that are to be executed such as setting of the destination should be preferentially shown on the screen of the display unit 5 so that the user can visually confirm it.

Figure 5:
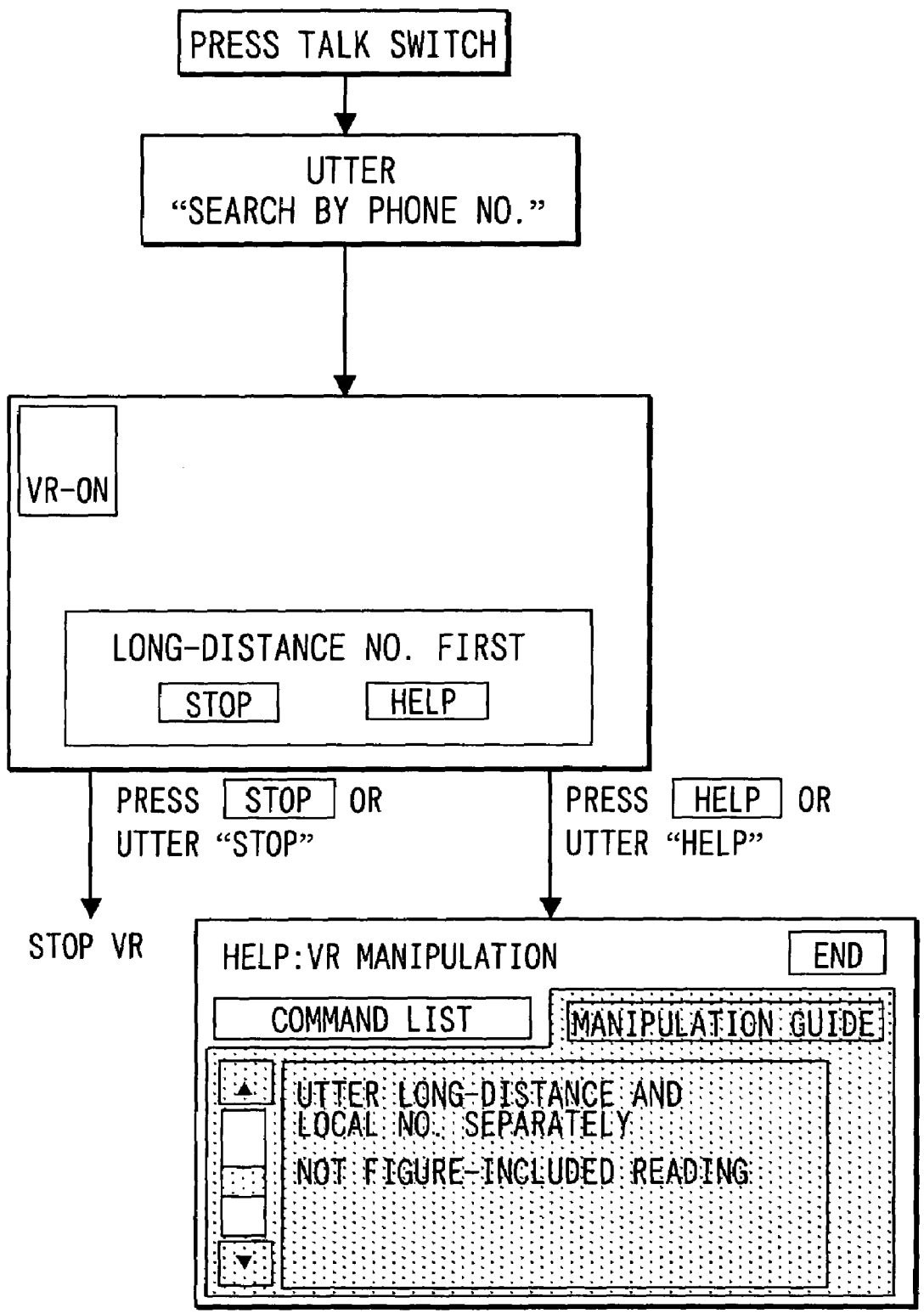
FIG. 5 is a schematic diagram explaining other instance of an assist window and auxiliary switches for assisting voice input manipulation on the display unit.

Another instance in FIG. 5 is a display for accepting a phone number through voice input. This display is shown after the voice input mode is started by pressing of the talk switch 3 and then "SEARCH BY PHONE NUMBER" is inputted through the voice input, as shown in FIG. 5.

In this case, "LONG-DISTANCE NO. FIRST" in the assist window is displayed for notifying that the user can input the phone number through the voice input. Here, auxiliary switches of "STOP" and "HELP" are shown simultaneously. When the switch of "STOP" is selected, accepting of the phone number is terminated and the display returns to the initial display shown on the screen in the upper portion of FIG. 3.

When the switch of "HELP" is selected, "MANIPULATION GUIDE" showing instruction regarding voice input is shown on the screen of the display unit 5. In detail, there are instructions such as "UTTER LONG-DISTANCE AND LOCAL NO. SEPARATELY" or "NOT FIGURE-INCLUDED READING, BUT SERIAL READING BY DIGIT." The user thereby inputs voice with considering the instruction. This results in enhancing recognition degree of the inputted phone numbers and to thereby enable the user to smoothly manipulate the voice input.

(Modification)

The assist window or the auxiliary switches are limited to the above-mentioned instances.

For instance, there is a case that a phone number of a destination is inputted while a preset destination is already set. Here, an assist window is shown as inquiring whether the preset destination is altered to the newly inputted destination or the newly inputted destination is added as a passing point. The auxiliary switches can be "ALTER" or "ADD."

Here, although "ALTER" or "ADD" is apt to be mis-recognized, providing of the auxiliary switches enables executing of a relevant function as the user intends.

In the above embodiment, the VR unit 4 is constructed separately from the navigation ECUL. However, the VR unit 4 can be integrated into the navigation ECU 1.

Furthermore, the present invention can be directed not only to the car navigation device but also other devices such as an electric appliance or a robot, to which the voice recognition can be adopted.

It will be obvious to those skilled in the art that various changes may be made in the above-described embodiments of the present invention. However, the scope of the present invention should be determined by the following claims.

What is claimed is:

1. A voice control system for an in-vehicle navigation device, the system including:
   a voice inputting unit configured to input a speech uttered by a user through voice input;
   a display unit configured to display a switch for a switch operation; and
   a controlling unit configured to recognize the inputted speech to thereby execute a function according to a speech content corresponding to the recognized speech, the controlling unit identifying to the user a content of a destination setting that is subsequently executed, and requiring the user to make an instruction for a determination of whether to affirm or negate the destination setting before the destination setting is executed, the instruction for the determination of the destination setting being able to be made by both the switching operation and via the voice input,
   the controlling unit comprising:
      a display-controlling unit for displaying, when the user utters the speech, an auxiliary switch that executes an auxiliary function for the voice input manipulation; and
      an executing unit for executing, when the auxiliary switch is selected, the auxiliary function.

2. The voice control system according to claim 1, wherein the controlling unit notifies, to the user, the content of the destination setting through instructing the display-controlling unit to display the content of the destination setting on the display unit.

3. The voice control system according to claim 1, wherein the display unit includes a screen and a detecting unit for detecting, on the screen, an area that the user touches, and
   wherein, when the user touches a predetermined area corresponding to either the first switch or the second switch that is displayed on the screen of the display unit, the executing unit determines that either the first switch or the second switch is selected.

4. A voice input method in a voice control system for an input navigation device, the control system that includes a display unit, voice inputting means for inputting a speech uttered by a user, and controlling means for recognizing, as a speech content, the inputted speech and thereby executing a function according to the speech content, the method comprising:
   notifying the user of a content of a destination setting;
   displaying on the display unit, simultaneously with the notifying, (i) a first switch for the user to make a first instruction to affirm the destination setting and (ii) a second switch for the user to make a second instruction to negate the destination setting;
   requiring the user to provide an instruction to either affirm or negate the destination setting before the destination setting is executed, the instruction to either affirm or negate the designation setting being able to be made by both voice input and a switch operation using the first and second switches; and
   providing, when either the first switch or the second switch is selected by the user, an instruction according to the corresponding first or second switch.

5. The voice input method of claim 4, wherein the displaying on the displaying unit of the first switch and the second switch is accomplished by displaying an assist window within a main display, the assist window including the first switch and the second switch.

* * * * *